United States Patent
Ota et al.

(10) Patent No.: US 12,481,122 B2
(45) Date of Patent: Nov. 25, 2025

(54) OPTICAL DISPLAY DEVICE

(71) Applicant: SEIKO EPSON CORPORATION, Tokyo (JP)

(72) Inventors: Hitoshi Ota, Shiojiri (JP); Yuiga Hamade, Matsumoto (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 337 days.

(21) Appl. No.: 18/451,825

(22) Filed: Aug. 17, 2023

(65) Prior Publication Data
US 2024/0061208 A1 Feb. 22, 2024

(30) Foreign Application Priority Data
Aug. 19, 2022 (JP) .................. 2022-130935

(51) Int. Cl.
*G02B 7/14* (2021.01)
(52) U.S. Cl.
CPC ..................... *G02B 7/14* (2013.01)

(58) Field of Classification Search
CPC ........................................ G02B 7/14
USPC .................................. 359/813, 822
See application file for complete search history.

(56) References Cited

U.S. PATENT DOCUMENTS

2024/0053606 A1\* 2/2024 Ide .................. G02B 23/00

FOREIGN PATENT DOCUMENTS

JP       2019174569        10/2019

\* cited by examiner

*Primary Examiner* — William Choi
(74) *Attorney, Agent, or Firm* — JCIPRNET

(57) ABSTRACT

An optical display device includes an image display element configured to emit image light, a deflection member configured to deflect the image light emitted from the image display element, an optical device including a lens barrel for accommodating a lens group including an objective lens and an eyepiece, and a moving mechanism provided at the lens barrel of the optical device and configured to hold a state in which at least the deflection member is moved in a direction intersecting an optical axis of the lens group.

11 Claims, 8 Drawing Sheets

OPTICAL DISPLAY DEVICE

The present application is based on, and claims priority from JP Application Serial Number 2022-130935, filed Aug. 19, 2022, the disclosure of which is hereby incorporated by reference herein in its entirety.

BACKGROUND

1. Technical Field

The present disclosure relates to an optical display device.

2. Related Art

JP 2019-174569 A discloses an optical device in which light emitted from a display is reflected by a beam splitter provided between an objective lens and an eyepiece and having semi-transmissive reflectivity to be guided to a user's eye.

In the above-described optical device, the beam splitter cannot be removed, and light from an outside scene is transmitted through the beam splitter even when an image is not displayed on the display. For this reason, there was a problem in that brightness of outside scene light is constantly decreased.

SUMMARY

In order to solve the above-described problems, according to an aspect of the present disclosure, there is provided an optical display device including an image display element configured to emit image light, a deflection member configured to deflect the image light emitted from the image display element, an optical device including a lens barrel for accommodating a lens group including an objective lens and an eyepiece, and a moving mechanism provided at the lens barrel of the optical device and configured to move at least the deflection member in a direction intersecting an optical axis of the lens group.

DESCRIPTION OF EMBODIMENTS

First Embodiment

Figure 1:
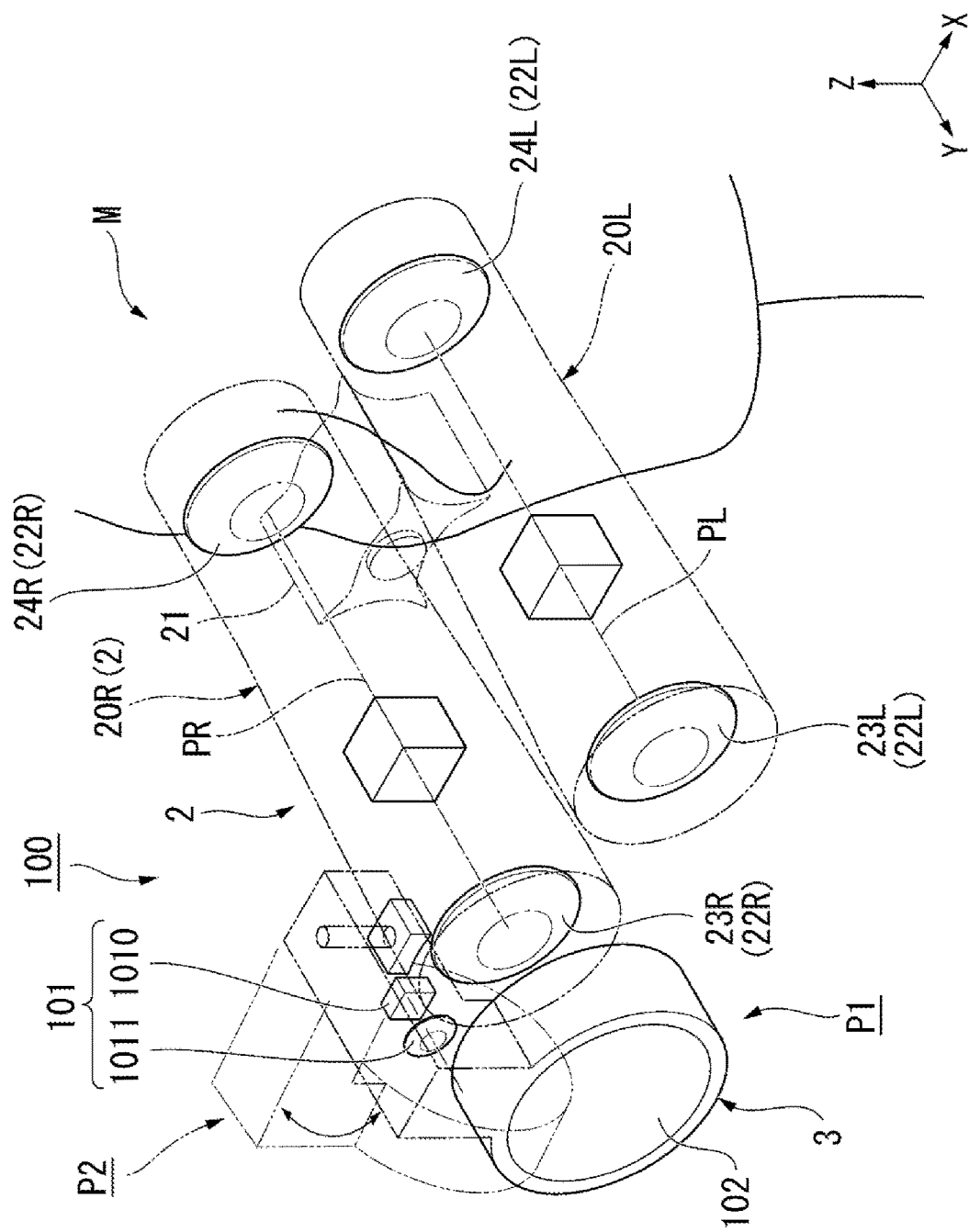
FIG. 1 is a diagram illustrating a schematic configuration of an optical display device of a first embodiment.

An embodiment of the present disclosure will be described in detail below with reference to the accompanying drawings. Note that, in the drawings used for the following descriptions, characteristic portions are expanded for convenience to make characteristics easily comprehensible in some cases, thus dimension ratios among respective constituent elements or the like are not necessarily the same as actual dimension ratios.

FIG. 1 is a diagram illustrating a schematic configuration of an optical display device of the present embodiment.

As illustrated in FIG. 1, an optical display device 100 of the present embodiment includes a binocular viewer (optical device) 2 and an optical display unit 3. The binocular viewer 2 is constituted by a pair of left and right lens barrels 20R and 20L and a coupling portion 21 for coupling the lens barrels 20R and 20L to each other. Each of the lens barrels 20R and 20L has a substantially cylindrical shape. A right-eye lens group 22R is accommodated in the lens barrel 20R, and a left-eye lens group 22L is accommodated in the lens barrel 20L. The right-eye lens group 22R and the left-eye lens group 22L constitute a binocular optical system, and optical axes PR and PL of the respective lens groups are parallel to each other.

In the following description, arrangement of respective members of the optical display device 100 will be described using an XYZ coordinate system as necessary. In the present embodiment, a direction along an X-axis corresponds to a left-right direction as viewed from a user M of the binocular viewer 2 looking into an eyepiece, a direction along a Y-axis corresponds to a front-back direction as viewed from the user M, and a direction along a Z-axis is orthogonal to the X-axis and the Y-axis and corresponds to an up-down direction as viewed from the user M. In the following description, a direction parallel to the X-axis direction is referred to as a left-right direction X, a direction parallel to the Y-axis direction is referred to as a front-back direction Y, and a direction parallel to the Z-axis direction is referred to as an up-down direction Z. In addition, a +X side in the X-axis direction is referred to as a "left side", and a −X side in the X-axis direction is referred to as a "right side". In addition, a +Y side in the Y-axis direction is referred to as a "front side", and the −Y side in the Y-axis direction is referred to as a "back side". In addition, a +Z side in the Z-axis direction is referred to as an "upper side", and a −Z side in the Z-axis direction is referred to as a "lower side".

The right-eye lens group 22R includes an objective lens 23R, an eyepiece 24R and a prism. The left-eye lens group 22L has a configuration similar to that of the right-eye lens group 22R. The left-eye lens group 22L includes an objective lens 23L, an eyepiece 24L and a prism.

Any of the objective lenses 23R and 23L and the eyepieces 24R and 24L may be constituted by a plurality of lenses or may be constituted by one lens.

In the case of the present embodiment, the prism is constituted by, for example, a pair of roof prisms. An optical path between the objective lens 23R and the eyepiece 24R and an optical path between the objective lens 23L and the eyepiece 24L are bent by the respective prisms, but the optical axis PR of the objective lens 23R and the eyepiece 24R and the optical axis PL of the objective lens 23L and the eyepiece 24L are linear. The binocular viewer 2 of the present embodiment is of a so-called roof prism type.

In the present embodiment, the optical display unit 3 is attached to an end portion on a light incident side of the lens barrel 20R of the binocular viewer 2. At least a part of the optical display unit 3 is attached so as to be movable with respect to the lens barrel 20R of the binocular viewer 2. The optical display unit 3 can superimpose and display desired image light on an observation image of an outside scene observed by the binocular viewer 2.

Figure 2:
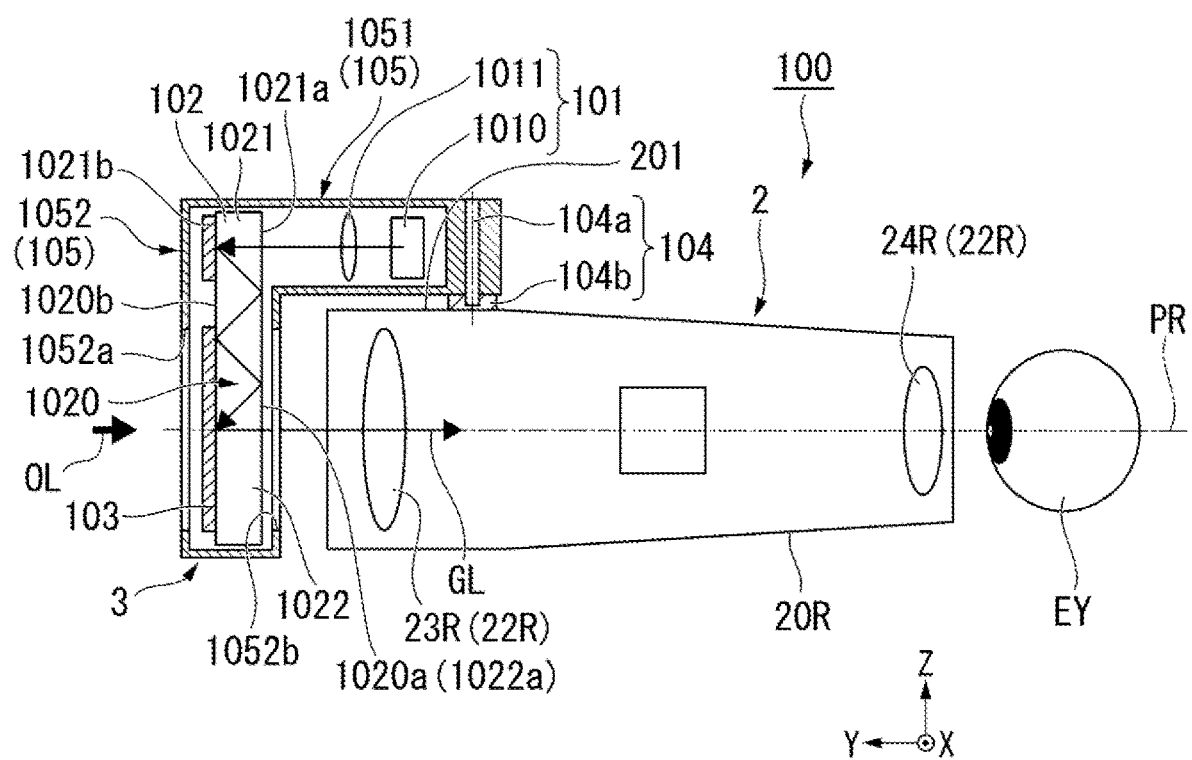
FIG. 2 is a diagram illustrating a cross-sectional configuration of the optical display device.

FIG. 2 is a diagram illustrating a cross-sectional configuration of the optical display device 100.

As illustrated in FIG. 2, the optical display unit 3 is provided with an image display unit 101 that emits image light GL, a light-guiding member 102 that guides the image light GL emitted from the image display unit 101, a deflection member 103 that deflects the image light GL propagating inside the light-guiding member 102 to extract the image light GL to an outside of the light-guiding member 102, a moving mechanism 104 and a first housing portion 105.

The first housing portion 105 is a housing that holds the image display unit 101, the light-guiding member 102 and the deflection member 103. The first housing portion 105 has a substantially L-shaped outer shape in a cross-sectional view. The first housing portion 105 includes a first accommodation portion 1051 that accommodates the image display unit 101 and a second accommodation portion 1052 that accommodates the light-guiding member 102 and the deflection member 103. The first accommodation portion 1051 extends in the front-back direction Y, and the second accommodation portion 1052 is coupled to the first accommodation portion 1051 and extends in the up-down direction Z.

The first accommodation portion 1051 of the first housing portion 105 is supported by an upper side (+Z side) on the light incident side of the lens barrel 20R via the moving mechanism 104. The first housing portion 105 is supported by an outer circumferential surface 201 of the lens barrel 20R so as to be rotatable by the moving mechanism 104, as will be described later. The moving mechanism 104 includes a rotary shaft 104a that rotatably supports the first housing portion 105 and a base portion 104b that supports the rotary shaft 104a.

The second accommodation portion 1052 of the first housing portion 105 is provided with a first opening 1052a causing outside scene light to be incident on the deflection member 103 and a second opening 1052b that emits outside scene light OL incident from the first opening 1052b and transmitted through the deflection member 103 and the image light GL deflected by the deflection member 103 to the outside.

The image display unit 101 includes an image display element 1010 and a projection optical system 1011. The image display element 1010 includes, for example, a top emission type organic EL panel. Accordingly, the image display element 1010 can emit the full-color image light GL. The projection optical system 1011 includes, for example, a convex lens, collimates the image light GL emitted from the image display element 1010 and causes the collimated image light GL to be incident on the light-guiding member 102 which will be described later.

The light-guiding member 102 includes a plate-shaped light-guiding portion 1020, a light-incident portion 1021 provided on one end side in a length direction of the light-guiding portion 1020 and a light-emitting portion 1022 provided on another end side in the length direction of the light-guiding portion 1020. In the present embodiment, the light-guiding portion 1020, the light-incident portion 1021 and the light-emitting portion 1022 are integrally formed of a light transmissive member such as glass or plastic.

The light-guiding portion 1020 propagates the image light GL by total reflection. The light-guiding portion 1020 includes a first surface 1020a and a second surface 1020b opposed to each other.

The light-incident portion 1021 causes the image light GL from the image display unit 101 to be incident inside the light-guiding member 102. The light-incident portion 1021 includes an incident surface 1021a on which the image light GL is incident and a deflection member 1021b that deflects a traveling direction of the image light GL incident from the incident surface 1021a. The incident surface 1021a is constituted by a part of the first surface 1020a of the light-guiding portion 1020. The deflection member 1021b is constituted by, for example, an optical device such as a diffraction element, a hologram or a mirror and diffracts the optical path of the image light GL in a predetermined direction, that is, deflects the optical path of the image light GL. The image light GL deflected by the deflection member 1021b is totally reflected between the first surface 1020a and the second surface 1020b to propagate inside the light-guiding member 102.

The light-emitting portion 1022 reflects the image light GL propagating inside the light-guiding portion 1020 by the total reflection and extracts the image light GL to the outside of the light-guiding member 102. The light-emitting portion 1022 includes an emission surface 1022a from which the image light GL is emitted. The emission surface 1022a is constituted by a part of the first surface 1020a of the light-guiding portion 1020.

In the present embodiment, the deflection member 103 on an emission side is provided at a position facing the emission surface 1022a of the second surface 1020b of the light-guiding portion 1020. The deflection member 103 is constituted by, for example, a reflective volume hologram or a diffraction element and diffracts the optical path of the image light GL in a predetermined direction, that is, deflects the optical path of the image light GL, and the deflection member 103 has optical transparency.

The moving mechanism 104 of the present embodiment supports the first housing portion 105 so as to be rotatable with respect to the outer circumferential surface 201 of the lens barrel 20R. To be specific, the moving mechanism 104 supports the first housing portion 105 so as to be rotatable around the rotary shaft 104a. The rotary shaft 104a is a shaft intersecting the optical axis PR of the right-eye lens group 22R and parallel to the up-down direction Z perpendicular to the outer circumferential surface 201 of the lens barrel 20R. In other words, the rotary shaft 104a is a shaft parallel to the Z-axis, and the first housing portion 105 rotates along a plane parallel to an XY plane.

Note that as for the moving mechanism 104, a configuration may be adopted in which the first housing portion 105 is rotated about the rotary shaft 104a by using a driving device such as a motor, or a configuration may be adopted in which the first housing portion 105 is rotated about the rotary shaft 104a by a manual operation by the user of the binocular viewer 2.

The light-guiding member 102 held by the first housing portion 105 is moved by the moving mechanism 104 in a direction intersecting the optical axis PR of the right-eye lens group 22R on the light incident side of the lens barrel 20R of the binocular viewer 2. In the present embodiment, the deflection member 103 is movable together with the light-guiding member 102 in the left-right direction X intersecting the optical axis PR of the right-eye lens group 22R.

Figure 3:
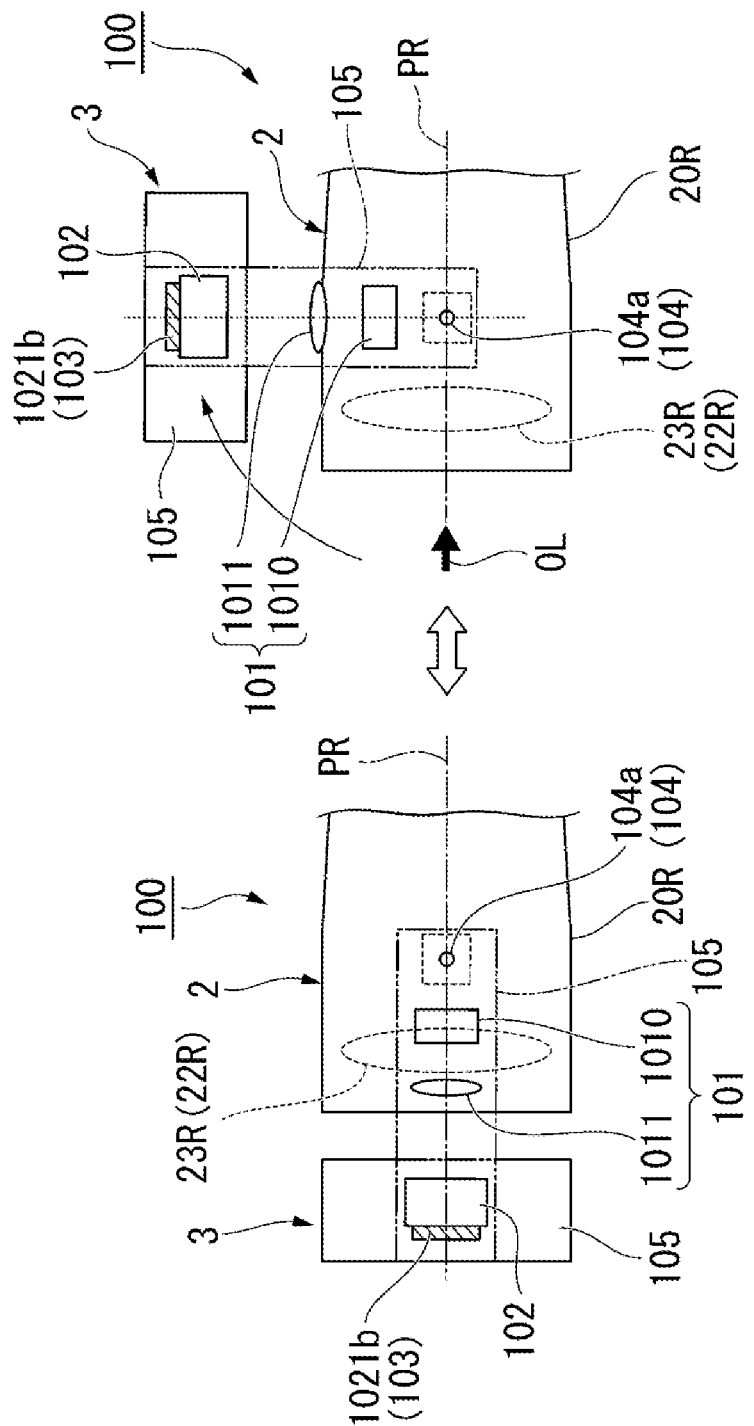
FIG. 3 is an operation explanatory diagram of a moving mechanism.

FIG. 3 is an operation explanatory diagram of the moving mechanism 104. FIG. 3 is a diagram of the optical display device 100 as viewed from the upper side (+Z).

As illustrated in FIG. 3, the moving mechanism 104 changes a position of the light-guiding member 102 accommodated in the first housing portion 105 and a position of the deflection member 103 provided at the light-guiding member 102 by the first housing portion 105 rotating around the rotary shaft 104a. Thus, the moving mechanism 104 switches the position of the deflection member 103 between a first position P1 and a second position P2.

At the first position P1, the deflection member 103 and the optical axis PR of the right-eye lens group 22R are aligned on a straight line and overlap each other. When the position of the deflection member 103 is the first position P1, the image display unit 101 emits the image light GL from the image display element 1010. Note that latch structure (not illustrated) may be provided at the moving mechanism 104 to switch between the first position P1 and the second position P2. By providing such a latch mechanism, it is possible to prevent the deflection member 103 from being unintentionally moved between the first position P1 and the second position P2, and thus it is possible to improve operability when the optical display device 200 is used.

As illustrated in FIG. 2, in the optical display device 100 of the present embodiment, since the deflection member 103 located at the first position P1 is arranged on the optical axis PR of the right-eye lens group 22R, the image light GL deflected by the deflection member 103 and emitted from the light-emitting portion 1022 (emission surface 1022a) of the light-guiding member 102 can be caused to be efficiently incident on the right-eye lens group 22R.

In the optical display device 100 of the present embodiment, the first housing portion 105 has a shape that covers the entire lens barrel 20R in plan view in the optical axis PR direction when the deflection member 103 is located at the first position P1. For this reason, since the lens barrel 20R is not exposed on a back surface side of the light-guiding member 102, it is possible to suppress deterioration of appearance of the optical display device 100.

In the present embodiment, the deflection member 103 and the light-guiding member 102 have optical transparency. Therefore, the outside scene light OL can pass through the deflection member 103 and the light-guiding member 102. In the optical display device 100 of the present embodiment, even when the deflection member 103 is located at the first position P1, the outside scene light OL can be seen-through, and the user can visually recognize an image in which the image light GL is superimposed on the outside scene light OL.

On the other hand, the second position P2 is a position at which the optical axis PR of the right-eye lens group 22R and the deflection member 103 do not overlap each other. The second position P2 is a position different from the first position P1 by, for example, 90° in a clockwise direction of the rotary shaft 104a when viewed from the upper side (+Z). Note that it is sufficient that the second position P2 is a position at which the optical axis PR and the deflection member 103 do not overlap each other, that is, a position at which the image light GL deflected by the deflection member 103 cannot be incident on the right-eye lens group 22R, and the rotation angle with respect to the first position P1 is not limited to 90°, and the second position P2 may be a position rotated counterclockwise around the rotary shaft 104a.

In the optical display device 100 of the present embodiment, by switching to the second position P2, the deflection member 103 moves to a position rotated clockwise by 90° with respect to the first position P1, and thus the deflection member 103 is no more located on the optical axis PR of the right-eye lens group 22R. Therefore, the user of the binocular viewer 2 can visually recognize the bright outside scene light OL directly incident on the objective lens 23R without passing through the light-guiding member 102 and the deflection member 103.

Here, in the optical display unit 3, there is a case where only the outside scene is visually recognized in a state where the image light GL is not displayed. When only the outside scene is visually recognized as described above, and the light-guiding member 102 is provided on the light incident side of the objective lens 23R, brightness of the outside scene visually recognized by eyes of the user of the binocular viewer 2 is reduced since the outside scene passes through the light-guiding member 102.

On the other hand, in the optical display device 100 of the present embodiment, the user can visually recognize the outside scene light OL directly incident on the objective lens 23R without passing through the light-guiding member 102 by switching the position of the deflection member 103 to the second position P2 by the moving mechanism 104. Therefore, the user of the binocular viewer 2 can visually recognize the bright outside scene light OL.

As described above, the optical display device 100 of the present embodiment includes the image display element 1010 that emits the image light GL, the deflection member 103 that deflects the image light GL emitted from the image display element 1010, the binocular viewer 2 that includes the lens barrel 20R that accommodates the right-eye lens group 22R including the objective lens 23R and the eyepiece 24R and the lens barrel 20L that accommodates the left-eye lens group 22L including the objective lens 23L and the eyepiece 24L, and the moving mechanism 104 that is provided at the lens barrel 20R of the binocular viewer 2 and moves at least the deflection member 103 in the direction intersecting the optical axis PR of the right-eye lens group 22R.

According to the optical display device 100 of the present embodiment, by moving the deflection member 103 in the direction intersecting the optical axis PR of the right-eye lens group 22R by the moving mechanism 104, it is possible to easily switch between a state in which the image light GL is caused to be visually recognized by an eye EY of the user of the binocular viewer 2 and a state in which the bright outside scene light OL is caused to be visually recognized by the eye EY of the user of the binocular viewer 2. Therefore, a display device with a high added value is provided which suppresses a decrease in brightness of an outside scene in the binocular viewer 2 and causes light obtained by superimposing the image light GL on the outside scene to be visually recognized.

Second Embodiment

Next, a configuration of an optical display device according to a second embodiment of the present disclosure will be described. A difference between the present embodiment and the first embodiment is a configuration of a moving mechanism and the other configurations are common. Thus, hereinafter, the same reference numerals are given to the configurations or members common with the first embodiment and detailed descriptions thereof will be omitted.

Figure 4:
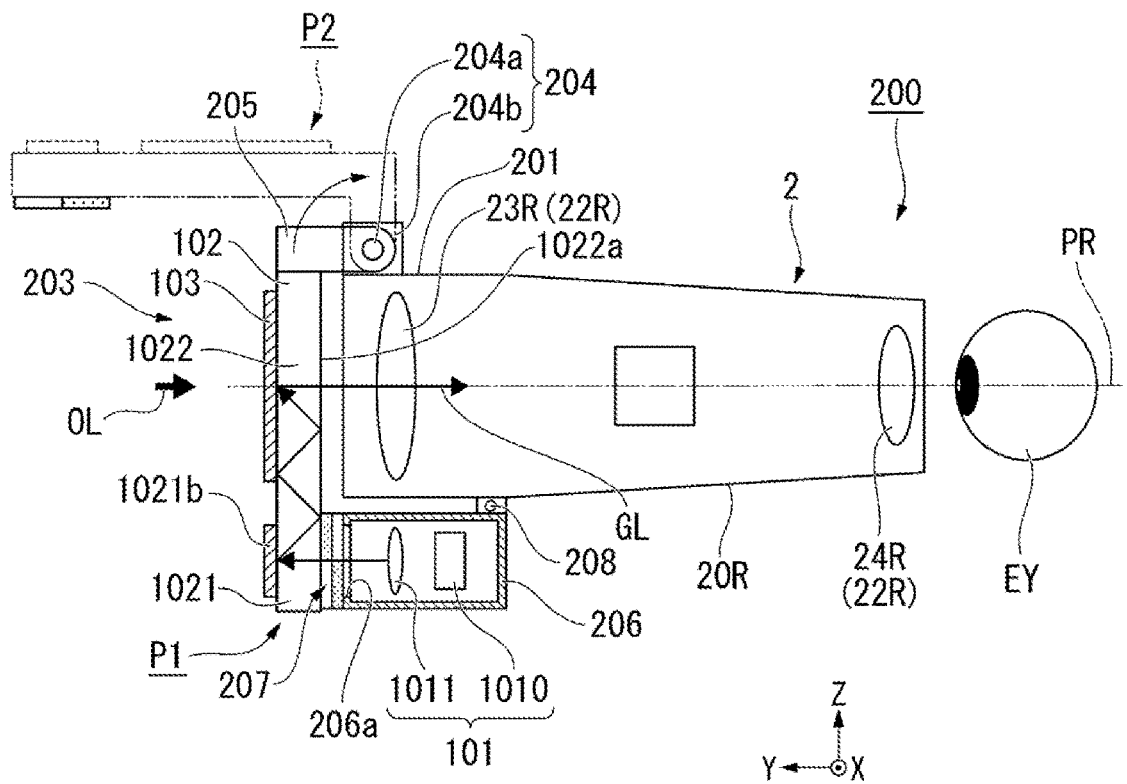
FIG. 4 is a diagram illustrating a cross-sectional configuration of an optical display device of a second embodiment.

FIG. 4 is a diagram illustrating a cross-sectional configuration of an optical display device 200 of the present embodiment.

As illustrated in FIG. 4, an optical display unit 203 in the optical display device 200 of the present embodiment includes the image display unit 101, the light-guiding member 102, the deflection member 103, a moving mechanism 204, a holding member 205, a second housing portion 206 and a positioning member 207.

The holding member 205 is a member that holds the deflection member 103. The first housing portion 105 extends in the up-down direction Z, and an end portion on the upper side (+Z) is supported by an upper side (+Z side) on the light incident side of the lens barrel 20R via the moving mechanism 204. The moving mechanism 204 includes a rotary shaft 204a that rotatably supports the deflection member 103 provided at the light-guiding member 102 via the holding member 205, and the base portion 204b that supports the rotary shaft 204a.

The moving mechanism 204 of the present embodiment supports the light-guiding member 102 and the deflection member 103 provided at the light-guiding member 102 via the holding member 205 so as to be rotatable with respect to the outer circumferential surface 201 of the lens barrel 20R. To be specific, the moving mechanism 204 supports the light-guiding member 102 so as to be rotatable around the rotary shaft 204a via the holding member 205. The rotary shaft 204a is a shaft that intersects the optical axis PR of the right-eye lens group 22R and is parallel to a tangential line of the outer circumferential surface 201 of the lens barrel 20R. In the case of the present embodiment, the rotary shaft 204a is a shaft parallel to the left-right direction X, and the holding member 205 rotates around the rotary shaft 204a along a plane parallel to a YZ plane.

Note that for the moving mechanism 204, a configuration may be adopted in which the holding member 205 is rotated around the rotary shaft 204a by using a driving device such as a motor, or a configuration may be adopted in which the holding member 205 is rotated around the rotary shaft 204a by a manual operation by the user of the binocular viewer 2.

The light-guiding member 102 held by the holding member 205 is moved by the moving mechanism 204 in a direction intersecting the optical axis PR of the right-eye lens group 22R on the light incident side of the lens barrel 20R of the binocular viewer 2. To be more specific, the holding member 205 rotates around the rotary shaft 204a in the cantilever state so that an end portion on the lower side (−Z) is movable in the up-down direction Z. With the moving mechanism 204 of the present embodiment, the deflection member 103 is movable together with the light-guiding member 102 in the up-down direction Z intersecting the optical axis PR of the right-eye lens group 22R.

The second housing portion 206 accommodates the image display unit 101 therein. The second housing portion 206 is attached to a lower side (−Z side) on the light incident side of the lens barrel 20R via a fixing portion 208 such as a screw, for example. The second housing portion 206 is provided with an opening 206a for emitting the image light GL projected from the projection optical system 1011.

When the holding member 205 is rotated around the rotary shaft 204a, the moving mechanism 204 changes a position of the light-guiding member 102 held by the holding member 205 and a position of the deflection member 103 provided at the light-guiding member 102. Thus, the moving mechanism 204 switches the position of the deflection member 103 between the first position P1 and the second position P2.

In the present embodiment, the first position P1 is a position at which the light-incident portion 1021 of the light-guiding member 102 and the image display element 1010 face each other, and the optical axis PR of the right-eye lens group 22R and the deflection member 103 overlap each other. The second position P2 is a position at which the light-incident portion 1021 of the light-guiding member 102 and the image display element 1010 do not face each other, and the optical axis PR of the right-eye lens group 22R and the deflection member 103 do not overlap each other. Note that latch structure (not illustrated) may be provided at the moving mechanism 204 to prevent the holding member 205 from being unintentionally moved between the first position P1 and the second position P2 to improve the operability of the optical display device 200.

In the case of the present embodiment, the second position P2 is a position different from the first position P1 by, for example, 90° in a clockwise direction of the rotary shaft 204a when viewed from the left side (+X).

In the optical display device 200 of the present embodiment, by switching to the second position P2, the deflection member 103 moves to the position rotated clockwise by 90° with respect to the first position P1, and thus the deflection member 103 is no more located on the optical axis PR of the right-eye lens group 22R. Therefore, the user of the binocular viewer 2 can visually recognize the bright outside scene light OL directly incident on the objective lens 23R without passing through the light-guiding member 102 and the deflection member 103.

The positioning member 207 defines positions of the light-incident portion 1021 of the light-guiding member 102 and the image display element 1010 at the first position P1. Since the light-incident portion 1021 and the image display element 1010 are positioned by the positioning member 207, the image light GL emitted from the image display element 1010 is efficiently incident into the light-guiding member 102 via the light-incident portion 1021.

Figure 5:
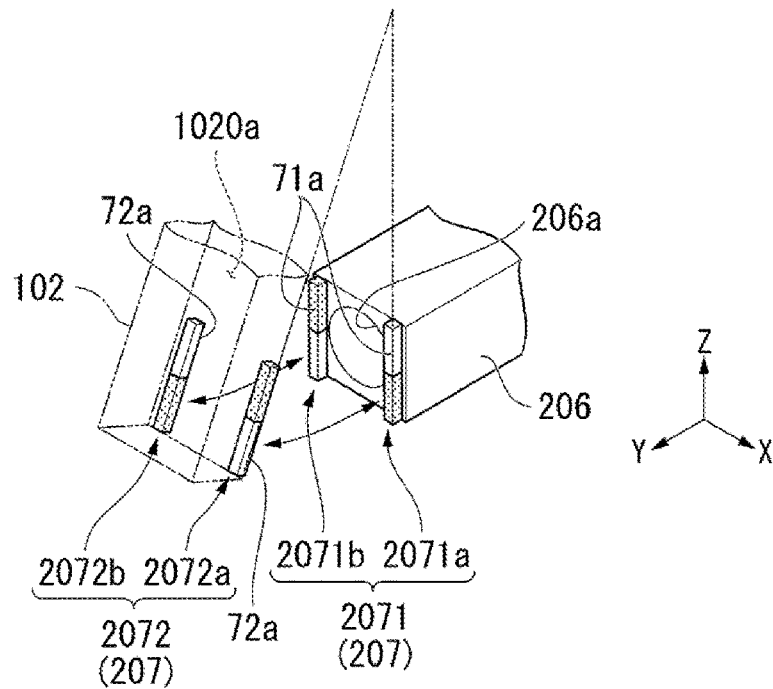
FIG. 5 is a perspective view illustrating a configuration of a main part of a positioning member.

FIG. 5 is a perspective view illustrating a configuration of a main part of the positioning member 207.

As illustrated in FIG. 5, the positioning member 207 includes first magnets 2071 and second magnets 2072. The first magnets 2071 are provided at the second housing portion 206. Note that FIG. 5 illustrates a state in which the first magnets 2071 and the second magnets 2072 are not attracted to each other in order to make the figure easy to see.

The first magnets 2071 are provided so as to sandwich both sides in the left-right direction X of the opening 206a of the second housing portion 206. The first magnets 2071 include a first site 2071a that is provided on the left side (+X side) of the opening 206a and in which an N pole and an S pole are aligned from the upper side (+Z side) to the lower side (−Z side), and a second site 2017b that is provided on the right side (−X side) of the opening 206a and in which an S pole and an N pole are aligned from the upper side (+Z side) to the lower side (−Z side).

The second magnets 2072 are provided at the first surface 1020a of the light-guiding member 102. The second magnets 2072 are provided at the second housing portion 206 and have polarities different from those of the first magnets 2071. The second magnets 2072 include a third site 2072a corresponding to the first site 2071a of the first magnets 2071 and a fourth site 2072b corresponding to the second site 2071b of the first magnet 2071. The third site 2072a has an S pole and an N pole aligned from the upper side (+Z side) toward the lower side (−Z side) and has polarities opposite to those of the first site 2071a. The fourth site 2072b has an N pole and an S pole aligned from the upper side (+Z side) toward the lower side (−Z side) and has polarities opposite to those of the second site 2071b.

At the first position P1, the first magnets 2071 and the second magnets 2072 of the positioning member 207 are attracted to each other. Attracting surfaces of the first magnets 2071 and the second magnets 2072, that is, surfaces 71a and 72a facing each other of the first magnets 2071 and the second magnets 2072 are parallel to an XZ plane.

The XZ plane along the surfaces 71a and 72a which are the attracting surfaces of the first magnets 2071 and the second magnets 2072 is orthogonal to the optical axis PR of the right-eye lens group 22R which is parallel to the Y-axis. Therefore, when the first magnets 2071 and the second magnets 2072 are attracted to each other, the positioning member 207 can regulate positions of the light-incident portion 1021 of the light-guiding member 102 and the image display element 1010 in the front-back direction Y.

In the positioning member 207 of the present embodiment, the first magnets 2071 are provided to be separated from each other and the second magnets 2072 are provided to be separated from each other in the left-right direction X, thus, when the first magnets 2071 and the second magnets 2072 are attracted to each other, positions of the light-incident portion 1021 of the light-guiding member 102 and the image display element 1010 in the left-right direction X can be regulated at two positions. Therefore, the positioning member 207 can regulate the positions of the light-incident portion 1021 and the image display element 1010 in the left-right direction X with higher accuracy.

Further, in each of the first magnets 2071 and the second magnets 2072, the two polarities are aligned in the up-down direction Z. Therefore, when the first magnets 2071 and the second magnets 2072 are attracted to each other, the positions of the light-incident portion 1021 of the light-guiding member 102 and the image display element 1010 in the up-down direction Y can be regulated at two positions. Therefore, positional accuracy of the light-incident portion 1021 and the image display element 1010 in the up-down direction Z can be improved with a simple configuration.

According to the optical display device 200 of the present embodiment, since the deflection member 103, at the first position P1, is located on the optical axis PR of the right-eye lens group 22R, the image light GL deflected by the deflection member 103 and emitted from the light-emitting portion 1022 (emission surface 1022a) of the light-guiding member 102 can be caused to be efficiently incident on the right-eye lens group 22R from the objective lens 23R.

As described above, according to the optical display device 200 of the present embodiment, by moving the deflection member 103 in the direction intersecting the optical axis PR of the right-eye lens group 22R by the moving mechanism 204, it is possible to easily switch between a state in which the image light GL is caused to be visually recognized by an eye EY of the user of the binocular viewer 2 and a state in which the bright outside scene light OL is caused to be visually recognized by the eye EY of the user of the binocular viewer 2. Therefore, a display device with a high added value is provided which suppresses a decrease in brightness of an outside scene in the binocular viewer 2 and causes light obtained by superimposing the image light GL on the outside scene to be visually recognized.

Note that the case has been exemplified in which the rotary shaft 204a of the moving mechanism 204 of the present embodiment is provided on the upper side (+Z) of the outer circumferential surface 201 of the lens barrel 20R, however, the position at which the rotary shaft 204a is provided is not limited thereto, and the rotary shaft 204a may be provided on the right side (−X), the left side (+X) or the lower side (−Z) of the outer circumferential surface 201 of the lens barrel 20R.

Third Embodiment

Next, a configuration of an optical display device according to a third embodiment of the present disclosure will be described. A difference between the present embodiment and the second embodiment is a configuration of a moving mechanism and the other configurations are common. Thus, hereinafter, the same reference numerals are given to the configurations or members common with the second embodiment and detailed descriptions thereof will be omitted.

Figure 6:
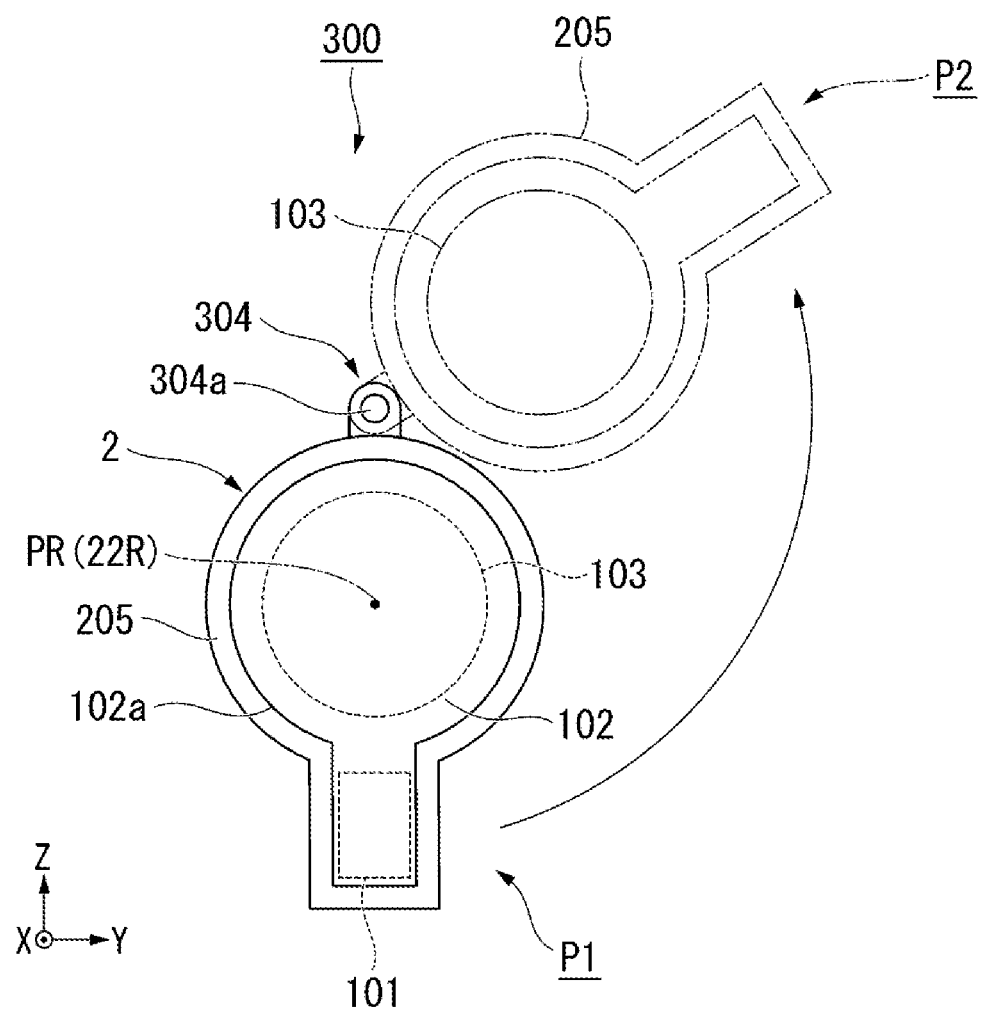
FIG. 6 is a front view of an optical display device of a third embodiment.

FIG. 6 is a front view of an optical display device 300 of the present embodiment. FIG. 6 is a diagram of the optical display device 300 viewed from the front side (+Y) toward the back side (−Y) in the front-back direction Y.

As illustrated in FIG. 6, a moving mechanism 304 in the optical display device 300 of the present embodiment supports the holding member 205 so as to be rotatable around a rotary shaft 304a. The holding member 205 of the present embodiment holds an outer side surface 102a of the light-guiding member 102 in a frame shape.

The rotary shaft 304a is a shaft that is parallel to the optical axis PR of the right-eye lens group 22R. In the case of the present embodiment, the rotary shaft 304a is a shaft parallel to the front-back direction Y, and the holding member 205 rotates around the rotary shaft 304a along a plane parallel to the XZ plane.

The moving mechanism 304 switches the position of the deflection member 103 between the first position P1 and the second position P2 by the holding member 205 rotating around the rotary shaft 304a.

In the case of the present embodiment, the first position P1 and the second position P2 are different from each other with respect to the rotary shaft 204a by, for example, 120° when viewed from the front side (+Y).

In the optical display device 300 of the present embodiment, by switching to the second position P2, the deflection member 103 moves to a position, for example, rotated counterclockwise by 120° with respect to the first position P1, and thus the deflection member 103 is no more located on the optical axis PR of the right-eye lens group 22R. Therefore, the user of the binocular viewer 2 can visually recognize the bright outside scene light OL directly incident on the objective lens 23R without passing through the light-guiding member 102 and the deflection member 103.

Note that it is sufficient that the second position P2 is a position at which the optical axis PR and the deflection member 103 do not overlap each other, that is, a position at which the image light GL deflected by the deflection member 103 cannot be incident on the right-eye lens group 22R, and the rotation angle with respect to the first position P1 is not limited to 120°, and the second position P2 may be a position rotated clockwise with respect to the rotary shaft 104a.

As described above, according to the optical display device 300 of the present embodiment, by moving the deflection member 103 in the direction intersecting the optical axis PR of the right-eye lens group 22R by the moving mechanism 304, it is possible to easily switch between a state in which the image light is caused to be visually recognized by the eye of the user of the binocular viewer 2 and a state in which the bright outside scene light is caused to be visually recognized by the eye of the user of the binocular viewer 2. Therefore, a display device with a high added value is provided which suppresses a decrease in brightness of an outside scene in the binocular viewer 2 and allows light obtained by superimposing the image light on the outside scene light to be visually recognized.

Note that the case has been exemplified in which the rotary shaft 304a of the moving mechanism 304 of the present embodiment is provided on the upper side (+Z) of the lens barrel 20R, however, the position at which the rotary shaft 304a is provided is not limited thereto, and the rotary shaft 304a may be provided on the right side (−X), the left side (+X) or the lower side (−Z) of the lens barrel 20R.

Fourth Embodiment

Next, a configuration of an optical display device according to a fourth embodiment of the present disclosure will be described. A difference between the present embodiment and the first embodiment is a configuration of a moving mechanism and the other configurations are common. Thus, hereinafter, the same reference numerals are given to the configurations or members common with the first embodiment and detailed descriptions thereof will be omitted.

Figure 7:
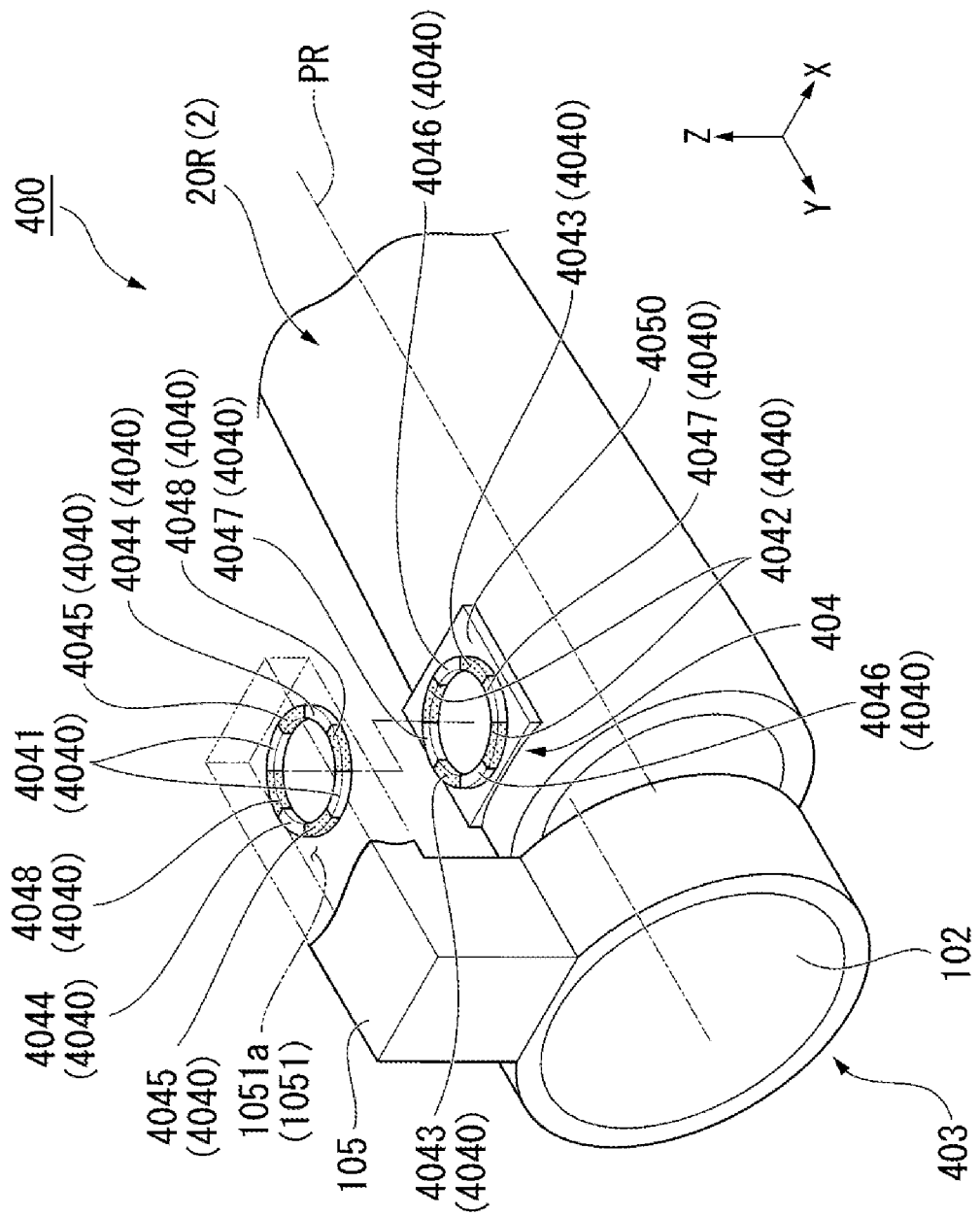
FIG. 7 is a perspective view illustrating a configuration of a main part of an optical display device of a fourth embodiment.

FIG. 7 is a perspective view illustrating a configuration of a main part of an optical display device 400 of the present embodiment.

As illustrated in FIG. 7, a moving mechanism 404 of an optical display unit 403 in the optical display device 400 of the present embodiment includes a plurality of magnets 4040 and a substrate 4050.

The plurality of magnets 4040 include a first magnet 4041, a fourth magnet 4044, a fifth magnet 4045 and an eighth magnet 4048 provided at the first housing portion 105, and a second magnet 4042, a third magnet 4043, a sixth magnet 4046 and a seventh magnet 4047 provided at the outer circumferential surface 201 of the lens barrel 20R.

In the case of the present embodiment, the first magnet 4041, the fourth magnet 4044, the fifth magnet 4045 and the eighth magnet 4048 are annularly arranged at a lower surface 1051a of the first accommodation portion 1051 of the first housing portion 105.

The first magnet 4041, the fourth magnet 4044, the fifth magnet 4045 and the eighth magnet 4048 are located at different positions in a circumferential direction and have the same size. Each of the first magnet 4041, the fourth magnet 4044, the fifth magnet 4045 and the eighth magnet 4048 is constituted by a pair of magnet pieces, and the respective magnet pieces are arranged so as to face each other with a center of a virtual circle in which the first magnet 4041, the fourth magnet 4044, the fifth magnet 4045 and the eighth magnet 4048 are arranged interposed therebetween.

For example, the first magnet 4041 and the fourth magnet 4044 each have a polarity of an N-pole, and the fifth magnet 4045 and the eighth magnet 4048 each have a polarity of an S-pole.

In the case of the present embodiment, the second magnet 4042, the third magnet 4043, the sixth magnet 4046 and the seventh magnet 4047 are annularly arranged on the substrate 4050 provided at the outer circumferential surface 201 of the lens barrel 20R. Note that since a surface of substrate 4050 is flat, the second magnet 4042, the third magnet 4043, the sixth magnet 4046 and seventh magnet 4047 are stably provided at the outer circumferential surface 201.

The second magnet 4042, the third magnet 4043, the sixth magnet 4046 and the seventh magnet 4047 are located at different positions in the circumferential direction and have the same size. Each of the second magnet 4042, the third magnet 4043, the sixth magnet 4046 and the seventh magnet 4047 is constituted by a pair of magnet pieces, and the respective magnet pieces are arranged so as to face each other with a center of a virtual circle in which the second magnet 4042, the third magnet 4043, the sixth magnet 4046 and the seventh magnet 4047 are arranged interposed therebetween.

For example, the second magnet 4042 and the third magnet 4043 each have a polarity of an S-pole, and the sixth magnet 4046 and the seventh magnet 4047 each have a polarity of an N-pole.

In the present embodiment, the center of the virtual circle in which the first magnet 4041, the fourth magnet 4044, the fifth magnet 4045 and the eighth magnet 4048 are arranged coincides with the center of the virtual circle in which the second magnet 4042, the third magnet 4043, the sixth magnet 4046 and the seventh magnet 4047 are arranged. An outer shape of an annular body formed by the first magnet 4041, the fourth magnet 4044, the fifth magnet 4045 and the eighth magnet 4048 is the same as an outer shape of an annular body formed by the second magnet 4042, the third magnet 4043, the sixth magnet 4046 and the seventh magnet 4047.

The moving mechanism 404 can fix the first housing portion 105 to the lens barrel 20R by the respective magnets provided at the first housing portion 105 and the respective magnets provided at the outer circumferential surface 201 of the lens barrel 20R being attracted to each other. The moving mechanism 104 can switch the position of the deflection member 103 between the first position P1 and the second position P2 by changing a combination of the magnets when the respective magnets provided at the first housing portion 105 and the respective magnets provided at the outer circumferential surface 201 of the lens barrel 20R are caused to be attracted to each other.

In the present embodiment, the first position P1 is a position at which the optical axis PR of the right-eye lens group 22R and the deflection member 103 overlap each other, and the second position P2 is a position at which the optical axis PR of the right-eye lens group 22R and the deflection member 103 do not overlap each other.

Figure 8:
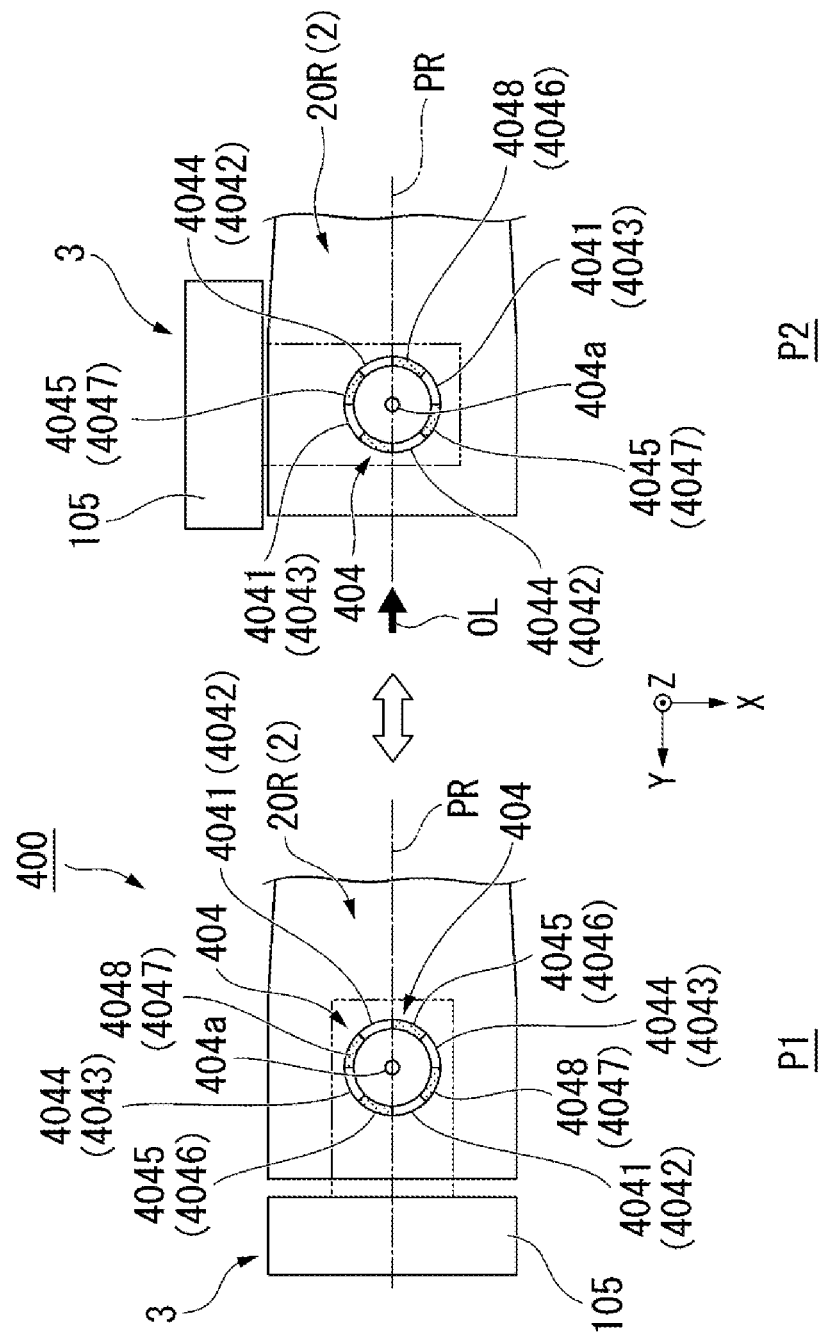
FIG. 8 is an operation explanatory diagram of a moving mechanism.

FIG. 8 is an operation explanatory diagram of the moving mechanism 404.

As illustrated in FIG. 8, the moving mechanism 404 positions the deflection member 103 at the first position P1 when the first magnet 4041 and the second magnet 4042 are attracted to each other, and positions the deflection member 103 at the second position P2 when the first magnet 4041 and the third magnet 4043 are attracted to each other. With the moving mechanism 404 of the present embodiment, switching between the first position P1 and the second position P2 is performed by rotating the first housing portion 105 around a rotation axis 404a. Here, the rotation axis 404a is an axis not defined by a support shaft that supports the first housing portion 105 but is defined virtually.

The rotation axis 404a is an axis that passes through the center of the annular body formed by the first magnet 4041, the fourth magnet 4044, the fifth magnet 4045 and eighth magnet 4048 and the center of the annular body formed by the second magnet 4042, the third magnet 4043, the sixth magnet 4046 and seventh magnet 4047.

The rotation axis 404a is an axis that intersects the optical axis PR of the right-eye lens group 22R and parallel to the up-down direction Z orthogonal to attracting surfaces of the respective magnets provided at the first housing portion 105 and the respective magnets provided at the outer circumferential surface 201 of the lens barrel 20R.

In the moving mechanism 404 of the present embodiment, when the deflection member 103 is located at the first position P1, the first magnet 4041 and the second magnet 4042 are attracted to each other, the fourth magnet 4044 and the third magnet 4043 are attracted to each other, the fifth magnet 4045 and the sixth magnet 4046 are attracted to each other, and the eighth magnet 4048 and the seventh magnet 4047 are attracted to each other.

Further, in the moving mechanism 404, when the deflection member 103 is located at the second position P2, the first magnet 4041 and the third magnet 4043 are attracted to each other, the fourth magnet 4044 and the second magnet 4042 are attracted to each other, the fifth magnet 4045 and the seventh magnet 4047 are attracted to each other, and the eighth magnet 4048 and the sixth magnet 4046 are attracted to each other.

In the optical display device 400 of the present embodiment, switching between the first position P1 and the second position P2 can be easily performed by lifting the first housing portion 105 to the upper side (+Z) to release the attraction between the magnets on the first housing portion 105 side and the magnets on the lens barrel 20R side, rotating the first housing portion 105 around the rotation axis 404a, and then causing the magnets on the first housing portion 105 side and the magnets on the lens barrel 20R side to be attracted to each other again.

As described above, according to the optical display device 400 of the present embodiment, by moving the deflection member 103 in the direction intersecting the optical axis PR of the right-eye lens group 22R by the moving mechanism 404, it is possible to easily switch between a state in which the image light GL is caused to be visually recognized by an eye EY of the user of the binocular viewer 2 and a state in which the bright outside scene light OL is caused to be visually recognized by the eye EY of the user of the binocular viewer 2. Therefore, a display device with a high added value is provided which suppresses a decrease in brightness of an outside scene in the binocular viewer 2 and causes light obtained by superimposing the image light GL on the outside scene to be visually recognized.

In addition, since the moving mechanism 404 of the present embodiment includes the plurality of magnets 4040, it is possible to easily perform switching between the first position P1 and the second position P2. In addition, by using attraction force of the plurality of magnets 4040, it is possible to prevent the deflection member 103 from being unintentionally moved between the first position P1 and the second position P2 without providing a latch mechanism, thus, it is possible to improve operability when the optical display device 400 is used. In addition, by removing the first housing portion 105 from the lens barrel 20R, the lens barrel 20R can be used as a normal binocular viewer.

Note that the case has been exemplified in which in the moving mechanism 404 of the present embodiment, the first magnet 4041, the second magnet 4042, the third magnet 4043, the fourth magnet 4044, the fifth magnet 4045, the sixth magnet 4046, the seventh magnet 4047 and the eighth magnet 4048 are used as the plurality of magnets 4040, however, the number of the plurality of magnets 4040 is not limited thereto. It is sufficient that the plurality of magnets 4040 include at least the first magnet 4041 provided at the first housing portion 105 and the second magnet 4042 and the third magnet 4043 provided at the outer circumferential surface 201 of the lens barrel 20R.

The example has been exemplified in each of the optical display devices of the above-described embodiments, in which the image display unit 101 is arranged on the light incident side of the lens barrel 20R, however, the image display unit 101 may be arranged on a light emission side of the lens barrel 20R. Hereinafter, a configuration in which the image display unit 101 is arranged on the light emission side of the lens barrel 20R will be described as a modification.

Modifications

Figure 9:
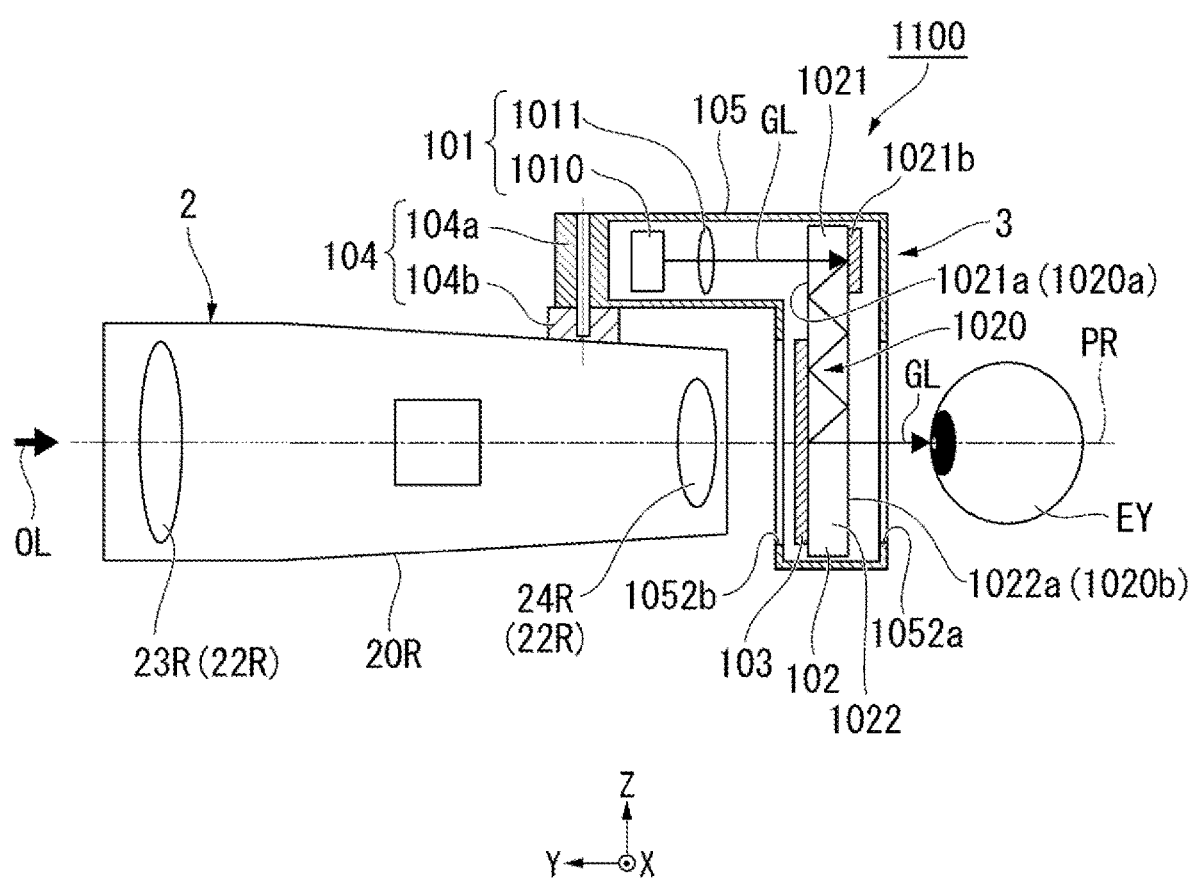
FIG. 9 is a diagram illustrating a cross-sectional configuration of an optical display device of a modification.

FIG. 9 is a diagram illustrating a cross-sectional configuration of an optical display device 1100 of a modification. FIG. 9 illustrates the modification according to the first embodiment.

As illustrated in FIG. 9, in the optical display device 1100 of the modification, the optical display unit 3 is attached to an end portion of the lens barrel 20R on a light emission side. That is, the second housing portion 206 is attached to the light emission side of the eyepiece 24R via the moving mechanism 104.

In the present modification, the incident surface 1021a of the light-guiding member 102 is constituted by a part of the first surface 1020a of the light-guiding portion 1020, and the emission surface 1022a is constituted by a part of the second surface 1020b of the light-guiding portion 1020. The deflection member 103 is provided at a position facing the emission surface 1022a of the first surface 1020a of the light-guiding portion 1020. That is, in the case of the present modification, the deflection member 103 and the image display unit 101 are arranged on the same surface (first surface 1020a) side of the light-guiding member 102. In the present modification, the deflection member 103 is movable together with the light-guiding member 102 toward the light emission side of the eyepiece 24R in a direction intersecting the optical axis PR of the right-eye lens group 22R via the moving mechanism 104.

According to the optical display device 1100 of the present modification, even in the structure in which the image display unit 101 is arranged on the eyepiece 24R side, the deflection member 103 can be moved forward and backward with respect to the optical axis PR of the right-eye lens group 22R by the moving mechanism 104. Therefore, when the outside scene is observed as the binocular viewer 2, the light-guiding member 102 and the deflection member 103 are not arranged on the optical axis PR of the right-eye lens group 22R by switching the position of the deflection member 103 from the first position P1 to the second position P2 by the moving mechanism 104, so that the outside scene light OL emitted from the eyepiece 24R can be directly incident on the eye EY of the user. Therefore, the user of the binocular viewer 2 can visually recognize the bright outside scene.

In addition, in the case of the present modification, since the image display unit 101 is arranged on the light emission side of the eyepiece 24R, the image light GL from the image display unit 101 is directly incident on the eye EY of the user without passing through the right-eye lens group 22R. For this reason, the user can visually recognize the brighter and clearer image light GL.

The present modification may be applied to the second to fourth embodiments. That is, the optical display unit may be attached to an end portion of the lens barrel 20R on the light emission side.

Note that the technical scope of the present disclosure is not limited to the above-described embodiments, and various modifications can be made to the above-described embodiments without departing from the spirit and gist of the present disclosure.

Furthermore, the specific configuration such as the number, arrangement, shape, and material of the various components that constitute a light source devices is not limited to the above-mentioned embodiments, and may be suitably changed.

In the above-described first embodiment, the case has been described as an example in which the magnet is used as the positioning member 207, however, a spacer member that maintains a constant gap between the light-guiding member 102 and the second housing portion 206 may be used as the positioning member. The spacer member may be provided at one or both of the light-guiding member 102 and the second housing portion 206.

In each of the above-described embodiments, the roof prism type binocular viewer has been described as an example, but the present disclosure can also be applied to a binocular viewer of a Porro prism type or a Galileo type.

Further, although the binocular viewer has been described as an example of the optical device, the present disclosure can be applied to a monocular, a finder and a microscope.

In each of the above-described embodiments, although the case has been exemplified in which the optical display unit 3 is attached to the right-eye lens barrel 20R of the binocular viewer 2, the present disclosure is also applicable to a case where the optical display unit 3 is attached to the left-eye lens barrel 20L. Further, the optical display units 3 may be arranged at both the lens barrels 20R and 20L.

In the above-described first embodiment, the case has been exemplified in which the image display unit 101 and the light-guiding member 102 are accommodated in the first housing portion 105, however, the first housing portion 105 may accommodate only the light-guiding member 102. In this case, the rotary shaft 104a of the moving mechanism 104 may be formed at another housing that accommodates the image display unit 101.

Also in the fourth embodiment, the first housing portion 105 may accommodate only the light-guiding member 102. In this case, the plurality of magnets 4040 constituting the moving mechanism 404 may be formed at another housing that accommodates the image display unit 101.

Although, in the above-described embodiment, the case has been exemplified in which the organic EL panel is used as the image display element 1010, the image display element 1010 is not limited to the organic EL panel, and it may be possible to use an inorganic EL panel, micro LED panel or other self-light-emission panel. Alternatively, a liquid crystal display panel may be used.

In each of the embodiments described above, the case has been exemplified in which the reflective diffraction element is used as the deflection member 103 that deflects the image light GL emitted from the image display element 1010, however, the deflection member may be constituted by a plurality of half mirrors embedded in the light-guiding member 102. The plurality of half mirrors constituting the deflection member are constituted by a dielectric multilayer film embedded in a portion of the light-guiding member 102 corresponding to the light-emitting portion 1022.

In each of the embodiments described above, the case has been exemplified in which the image light GL emitted from the image display element 1010 is incident from the incident surface 1021a of the light-guiding member 102, and then the optical path of the image light GL is deflected by the deflection member 1021b to be propagated inside the light-guiding member 102 by the total reflection, but the present disclosure is not limited thereto. For example, without using the deflection member 1021b, the image light GL may be incident on the first surface 1020a of the light-guiding portion 1020 from an oblique direction, the image light GL may be incident into the light-guiding portion 1020 using refraction of light by the first surface 1020a, and the image light GL may be propagated inside the light-guiding member 102 using total reflection.

Hereinafter, a summary of present disclosure is appended.

APPENDIX 1

An optical display device including
an image display element configured to emit image light,
a deflection member configured to deflect the image light emitted from the image display element,
an optical device including a lens barrel for accommodating a lens group including an objective lens and an eyepiece, and
a moving mechanism provided at the lens barrel of the optical device and configured to move at least the deflection member in a direction intersecting an optical axis of the lens group.

According to the optical display device having this configuration, by moving the deflection member in the direction intersecting the optical axis of the lens group by the moving mechanism provided at the lens barrel of the optical device such as a binocular viewer, it is possible to easily switch between a state in which image light is caused to be visually recognized by eyes of a user of the binocular viewer, and a state in which bright outside scene light is caused to be visually recognized by the eyes of the user of the binocular viewer. Therefore, it is possible to provide an optical display device with a high added value which suppresses a decrease in brightness of an outside scene in a binocular viewer and light obtained by superimposing image light on the outside scene is caused to be visually recognized.

APPENDIX 2

The optical display device according to appendix 1, further including a first housing portion provided with the moving mechanism and configured to hold at least the deflection member, wherein
the moving mechanism switches a position of the deflection member between a first position at which the optical axis of the lens group and the deflection member overlap each other and a second position at which the optical axis of the lens group and the deflection member do not overlap each other, by the first housing portion rotating around a rotary shaft intersecting the optical axis of the lens group and orthogonal to an outer circumferential surface of the lens barrel.

According to this configuration, by rotating the first housing portion around the rotary shaft orthogonal to the outer circumferential surface, it is possible to realize a configuration for easily switching between the state in which the image light is caused to be visually recognized by the eyes of the user of the binocular viewer, and the state in which the bright outside scene light is caused to be visually recognized by the eyes of the user of the binocular viewer.

APPENDIX 3

The optical display device according to appendix 1, further including a first housing portion provided with the moving mechanism and configured to hold at least the deflection member, wherein
the moving mechanism includes a first magnet provided at the first housing portion, a second magnet provided at the lens barrel, and a third magnet provided at the lens barrel at a position different from that of the second magnet, and
switches a position of the deflection member between a first position at which the first magnet and the second magnet are attracted to each other to fix the first housing portion and the lens barrel in a state in which the optical axis of the lens group and the deflection member overlap each other, and a second position at which the first magnet and the third magnet are attracted to each other to fix the first housing portion and the lens barrel in a state in which the optical axis of the lens group and the deflection member do not overlap each other.

According to this configuration, by causing the second magnet or the third magnet on the lens barrel side to be attracted to the first magnet provided at the first housing portion, it is possible to realize a configuration for easily switching between the state in which the image light is caused to be visually recognized by the eyes of the user of the binocular viewer, and the state in which the bright outside scene light is caused to be visually recognized by the eyes of the user of the binocular viewer. Further, removing the first housing portion from the lens barrel enables usage as a normal binocular viewer.

APPENDIX 4

The optical display device according to appendix 1, further including a first housing portion provided with the moving mechanism and configured to hold at least the deflection member, wherein the moving mechanism switches a position of the deflection member between a first position at which the optical axis of the lens group and the deflection member overlap each other and a second position at which the optical axis of the lens group and the deflection member do not overlap each other, by the first housing portion rotating around a rotary shaft along the optical axis of the lens group.

According to this configuration, by rotating the first housing portion around the rotary shaft along the optical axis, it is possible to realize a configuration for easily switching between the state in which the image light is caused to be visually recognized by the eyes of the user of the binocular viewer, and the state in which the bright outside scene light is caused to be visually recognized by the eyes of the user of the binocular viewer.

APPENDIX 5

The optical display device according to any one of appendices 2 to 4, further including a light-guiding member including a light-incident portion on which the image light from the image display element is incident, a light-guiding portion for propagating the image light incident from the light-incident portion by total reflection, and a light-emitting portion for emitting the image light propagating through the light-guiding portion and deflected by the deflection member, wherein the deflection member is provided at the light-guiding member, and the light-guiding member is held by the first housing portion.

According to this configuration, since the light-guiding member that propagates the image light therein using the total reflection is provided, it is possible to achieve a reduction in thickness and weight of a device configuration compared to a configuration in which the image light is reflected by a mirror and propagated.

APPENDIX 6

The optical display device according to appendix 1, further including a light-guiding member including a light-incident portion on which the image light from the image display element is incident, a light-guiding portion for propagating the image light incident from the light-incident portion by total reflection, and a light-emitting portion for emitting the image light propagating through the light-guiding portion and deflected by the deflection member, and provided with the deflection member, a holding member coupled to the lens barrel via the moving mechanism and configured to hold the light-guiding member, a second housing portion configured to accommodate the image display element, and a fixing portion configured to fix the second housing portion to the lens barrel, wherein the moving mechanism switches a position of the deflection member between a first position at which the light-incident portion of the light-guiding member and the image display element face each other and the optical axis of the lens group and the deflection member overlap each other, and a second position at which the light-incident portion of the light-guiding member and the image display element do not face each other and the optical axis of the lens group and the deflection member do not overlap each other, by the holding member rotating around a rotary shaft intersecting the optical axis of the lens group and along a tangential line of an outer circumferential surface of the lens barrel.

According to this configuration, it is possible to move the position of the deflection member together with the light-guiding member by rotating the holding member holding the light-guiding member around the rotary shaft along the tangential line of the outer circumferential surface of the lens barrel. Accordingly, it is possible to realize a configuration for easily switching between the state in which the image light is caused to be visually recognized by the eyes of the user of the binocular viewer, and the state in which the bright outside scene light is caused to be visually recognized by the eyes of the user of the binocular viewer.

APPENDIX 7

The optical display device according to appendix 6, further including a positioning member configured to define a position of the light-incident portion of the light-guiding member and a position of the second housing portion, at the first position.

According to this configuration, since the positioning member is included, it is possible to easily and accurately position the light-incident portion of the light-guiding member and the image display element accommodated in the second housing portion. Therefore, the image light can be caused to be efficiently incident on the light-incident portion of the light-guiding member.

APPENDIX 8

The optical display device according to appendix 7, wherein the positioning member includes a first magnet provided at the second housing portion and a second magnet having a polarity different from that of the first magnet and provided at the light-guiding member, and

in the positioning member, the first magnet and the second magnet are attracted to each other when the deflection member is located at the first position.

According to this configuration, by the first magnet and the second magnet being attracted to each other, it is possible to simply and highly accurately position the light-incident portion and the image display element.

APPENDIX 9

The optical display device according to appendix 8, wherein
an attracting surface of the first magnet and the second magnet is orthogonal to the optical axis of the lens group.

According to this configuration, the positioning member can regulate the positions of the light-incident portion of the light-guiding member and the image display element in a direction along the optical axis by causing the first magnet and the second magnet to be attracted to each other.

APPENDIX 10

The optical display device according to any one of appendices 1 to 9, wherein
the deflection member is arranged on a light incident side of the objective lens.

According to this configuration, since the deflection member is arranged on the light incident side of the objective lens, the deflection member does not contact a face of a user. Therefore, since structure around the eyepiece does not change before and after movement of the deflection member, it is possible to reduce a sense of incongruity given to the user of the binocular viewer when the image light is visually recognized.

APPENDIX 11

The optical display device according to any one of appendices 1 to 9, wherein
the deflection member is arranged on a light emission side of the eyepiece.

According to this configuration, since the deflection member is arranged on the light emission side of the eyepiece, the image light from the image display element is directly incident on the eye of the user without passing through the lens group. Therefore, the user can visually recognize the brighter and clearer image light.

What is claimed is:

1. An optical display device, comprising
an image display element configured to emit image light;
a deflection member configured to deflect the image light emitted from the image display element;
an optical device including a lens barrel for accommodating a lens group including an objective lens and an eyepiece; and
a moving mechanism provided at the lens barrel of the optical device and configured to move at least the deflection member in a direction intersecting an optical axis of the lens group.

2. The optical display device according to claim 1, further comprising a first housing portion provided with the moving mechanism and configured to hold at least the deflection member, wherein
the moving mechanism switches a position of the deflection member between a first position at which the optical axis of the lens group and the deflection member overlap each other and a second position at which the optical axis of the lens group and the deflection member do not overlap each other, by the first housing portion rotating around a rotary shaft intersecting the optical axis of the lens group and orthogonal to an outer circumferential surface of the lens barrel.

3. The optical display device according to claim 2, further comprising a light-guiding member including a light-incident portion on which the image light from the image display element is incident, a light-guiding portion for propagating the image light incident from the light-incident portion by total reflection, and a light-emitting portion for emitting the image light propagating through the light-guiding portion and deflected by the deflection member, wherein
the deflection member is provided at the light-guiding member, and
the light-guiding member is held by the first housing portion.

4. The optical display device according to claim 1, further comprising a first housing portion provided with the moving mechanism and configured to hold at least the deflection member, wherein
the moving mechanism includes a first magnet provided at the first housing portion, a second magnet provided at the lens barrel, and a third magnet provided at the lens barrel at a position different from that of the second magnet, and
switches a position of the deflection member between
a first position at which the first magnet and the second magnet are attracted to each other to fix the first housing portion and the lens barrel in a state in which the optical axis of the lens group and the deflection member overlap each other, and
a second position at which the first magnet and the third magnet are attracted to each other to fix the first housing portion and the lens barrel in a state in which the optical axis of the lens group and the deflection member do not overlap each other.

5. The optical display device according to claim 1, further comprising a first housing portion provided with the moving mechanism and configured to hold at least the deflection member, wherein
the moving mechanism switches a position of the deflection member between a first position at which the optical axis of the lens group and the deflection member overlap each other and a second position at which the optical axis of the lens group and the deflection member do not overlap each other, by the first housing portion rotating around a rotary shaft along the optical axis of the lens group.

6. The optical display device according to claim 1, further comprising:
a light-guiding member including a light-incident portion on which the image light from the image display element is incident, a light-guiding portion for propagating the image light incident from the light-incident portion by total reflection, and a light-emitting portion for emitting the image light propagating through the light-guiding portion and deflected by the deflection member, and provided with the deflection member;
a holding member coupled to the lens barrel via the moving mechanism and configured to hold the light-guiding member;
a second housing portion configured to accommodate the image display element; and a fixing portion configured to fix the second housing portion to the lens barrel, wherein the moving mechanism switches a position of the deflection member between a first position at which the light-incident portion of the light-guiding member and the image display element face each other and the optical axis of the lens group and the deflection member overlap each other, and a second position at which the light-incident portion of the light-guiding member and the image display element do not face each other and the optical axis of the lens group and the deflection member do not overlap each other, by the holding member rotating around a rotary shaft intersecting the optical axis of the lens group and along a tangential line of an outer circumferential surface of the lens barrel.

7. The optical display device according to claim 6, further comprising a positioning member configured to define a position of the light-incident portion of the light-guiding member and a position of the second housing portion, at the first position.

8. The optical display device according to claim 7, wherein the positioning member includes a first magnet provided at the second housing portion and a second magnet having a polarity different from that of the first magnet and provided at the light-guiding member, and in the positioning member, the first magnet and the second magnet are attracted to each other when the deflection member is located at the first position.

9. The optical display device according to claim 8, wherein an attracting surface of the first magnet and the second magnet is orthogonal to the optical axis of the lens group.

10. The optical display device according to claim 1, wherein the deflection member is arranged on a light incident side of the objective lens.

11. The optical display device according to claim 1, wherein the deflection member is arranged on a light emission side of the eyepiece.

\* \* \* \* \*